US012126967B2

(12) United States Patent
Nielsen

(10) Patent No.: US 12,126,967 B2
(45) Date of Patent: Oct. 22, 2024

(54) HEARING DEVICE

(71) Applicant: GN Hearing A/S, Ballerup (DK)

(72) Inventor: Henrik Nielsen, Roskilde (DK)

(73) Assignee: GN Hearing A/S, Ballerup (DK)

( * ) Notice: Subject to any disclaimer, the term of this patent is extended or adjusted under 35 U.S.C. 154(b) by 0 days.

(21) Appl. No.: 17/715,932

(22) Filed: Apr. 7, 2022

(65) Prior Publication Data

US 2022/0394401 A1 Dec. 8, 2022

(30) Foreign Application Priority Data

Jun. 2, 2021 (DK) ........................... PA 2021 70285
Jun. 2, 2021 (EP) ..................................... 21177424

(51) Int. Cl.
*H04R 25/00* (2006.01)

(52) U.S. Cl.
CPC ........... *H04R 25/65* (2013.01); *H04R 25/602* (2013.01); *H04R 2225/021* (2013.01); *H04R 2225/31* (2013.01)

(58) Field of Classification Search
CPC ........ H04R 25/00; H04R 25/60; H04R 25/65; H04R 25/602
USPC .................................................. 381/312, 322
See application file for complete search history.

(56) References Cited

U.S. PATENT DOCUMENTS 4,965,831 A * 10/1990 Schmid .................. H04R 25/65 381/330
2001/0040973 A1 11/2001 Fritz et al.
2002/0027996 A1 3/2002 Leedom et al.
2009/0208045 A1 8/2009 Reithinger et al.
2013/0016862 A1* 1/2013 Newton .................... H02J 7/34 381/323
2013/0243229 A1 9/2013 Shennib et al.
2014/0333012 A1* 11/2014 Riepenhoff ........... B29C 64/112 264/494
2015/0256941 A1 9/2015 Bymaster et al.
2015/0326982 A1* 11/2015 Sudan .................... H04R 25/00 381/323
2016/0344109 A1* 11/2016 Gomme ................. H01Q 21/28
2017/0127199 A1 5/2017 Marxen et al.
2020/0314566 A1* 10/2020 Perri ...................... H01Q 1/273

FOREIGN PATENT DOCUMENTS

EP 2026606 2/2009
WO WO 2004/036953 4/2004
WO WO 2013/078029 5/2013
(Continued)

OTHER PUBLICATIONS

Extended European Search Report for EP Patent Appln. No. 21177424.5 dated Dec. 16, 2021.
(Continued)

*Primary Examiner* — George C Monikang
(74) *Attorney, Agent, or Firm* — Vista IP Law Group, LLP

(57) ABSTRACT

The invention relates to a hearing device. The hearing device comprises an outer shell, the outer shell defining an outer compartment. The hearing device further comprises a receiver, and a rechargeable battery electrically connected to the receiver. Finally, the hearing device comprises a sealed inner compartment arranged in the outer compartment, wherein the receiver and the rechargeable battery are both arranged in the sealed inner compartment.

30 Claims, 5 Drawing Sheets

(56) References Cited

FOREIGN PATENT DOCUMENTS

| | | |
|---|---|---|
| WO | WO 2020/030576 | 2/2020 |
| WO | WO 2021/041843 | 3/2021 |

OTHER PUBLICATIONS

Technical examination report for Danish patent application No. PA 2021 70285 dated Nov. 30, 2021.

Further technical examination report for Danish patent application No. PA 2021 70285 dated Jul. 4, 2022.

* cited by examiner

HEARING DEVICE

RELATED APPLICATION DATA

This application claims priority to, and the benefit of, Danish Patent Application No. PA 2021 70285 filed on Jun. 2, 2021, and European Patent Application No. 21177424.5 filed on Jun. 2, 2021. The entire disclosures of the above applications are expressly incorporated by reference herein.

FIELD

The present disclosure relates to a hearing device. More particularly, the disclosure relates to a hearing device comprising a rechargeable battery.

BACKGROUND

Hearing devices, such as hearing aids and ear buds, are increasingly being made with rechargeable batteries for convenience and environmental reasons. Improvements in rechargeable battery technology has made it possible to achieve batteries with high capacity and high voltage in a compact package. However, these advances necessitate the rechargeable batteries be encapsulated.

At the same time, there is a push to miniaturize hearing device, while maintaining performance.

Hence, an improved hearing device would be advantageous, and in particular a more efficient and/or improved hearing device with a rechargeable battery would be advantageous.

SUMMARY

It is an objective of the present innovation to overcome the presented limitations in the prior art. In particular, it is an objective to provide a compact hearing device, which at the same time is sealed to prevent ingress of moisture.

It is a further object to provide an alternative to the prior art.

Thus, the above-described object and several other objects are intended to be obtained in a first aspect of an embodiment by providing a hearing device. The hearing device comprises an outer shell, the outer shell defining an outer compartment. The hearing device further comprises a receiver, and a rechargeable battery. Finally, the hearing device comprises a sealed inner compartment arranged in the outer compartment, wherein the receiver and the rechargeable battery are both arranged in the sealed inner compartment. In this way, a good acoustic sealing of the receiver may be achieved, eliminating or reducing sound leakage from the receiver out of the hearing device and/or to one or more optional microphone(s) of the hearing device. Simultaneously, an efficient mechanical and electrical sealing of the rechargeable battery is obtained. Sealing both the receiver and the battery in a single inner compartment achieves a particularly space efficient and/or mechanically simple solution. The microphone(s) may be arranged in the outer compartment outside the inner compartment.

In embodiments of the hearing device, the sealed inner compartment is airtight. In this way, the receiver and the rechargeable battery may be sealed from humidity and contamination from ambient air, thus limiting corrosion or other types of degradation of the device. By “airtight” it is meant that at atmospheric pressure the gas flow of atmospheric gas between the inside and outside of the inner compartment will be substantially zero.

In embodiments of the hearing device, the sealed inner compartment is watertight. In this way, the hearing device may be more resilient to influence from fluids, such as rain, sweat, etc. By “watertight” it is meant that the sealed inner compartment fulfills the requirements of at least the IP67 rating.

In embodiments of the hearing device, the receiver and rechargeable battery combined take up at least 40% of a volume of the sealed inner compartment, such as at least 50% of the volume of the sealed inner compartment, or even at least 60% of the volume of the sealed inner compartment.

In embodiments of the hearing device, the hearing device further comprises a power management circuit arranged in the sealed inner compartment.

In embodiments of the hearing device, the sealed inner compartment is fixed to the housing frame.

In embodiments of the hearing device, the sealed inner compartment is fixed by an adhesive to the housing frame.

In embodiments of the hearing device, the sealed inner compartment is fixed to the housing frame by one or more of heat soldering, ultrasonic welding, interference fit, and snap fit.

In embodiments of the hearing device, the sealed inner compartment is integrally formed in the housing frame.

In embodiments of the hearing device, the hearing device further comprises a magnetic induction (MI) coil arranged in the outer compartment, outside the sealed inner compartment.

In embodiments of the hearing device, hearing device further comprises a magnetic induction (MI) coil arranged in the sealed inner compartment.

In embodiments of the hearing device, the hearing device further comprises an inductive charging coil, the inductive charging coil being arranged inside the sealed inner compartment.

In embodiments of the hearing device, the hearing device further comprises a printed circuit board assembly (PCBA), the printed circuit board assembly being arranged in the outer compartment, outside the sealed inner compartment.

In embodiments of the hearing device, the hearing device further comprises a signal processor, the signal processor being arranged in the outer compartment, outside the sealed inner compartment. The signal processor is coupled to the microphone(s) to process audio signals by frequency dependent amplification based on a user’s frequency dependent hearing loss. The signal processor is coupled to the receiver so that the receiver may generate an audible acoustic signal representing sound captured by the microphone(s) compensated for the user’s hearing loss.

In embodiments of the hearing device, the sealed inner compartment is made from metal, plastic, composites, or a combination thereof.

In embodiments of the hearing device, the sealed inner compartment comprises a lid.

In embodiments of the hearing device, the sealed inner compartment comprises one or more openings for electrical connections between units of the hearing device arranged in the sealed inner compartment and units in the outer compartment, outside the sealed inner compartment.

In embodiments of the hearing device, the one or more openings comprises sealings, the sealings being arranged to seal with respect to sound and/or humidity leakage along the electrical connections.

In embodiments of the hearing device, the sealings are separate from the sealed inner compartment.

In embodiments of the hearing device, the sealings are molded using two-component molding together with the plastic frame.

In embodiments of the hearing device, the hearing device is a hearing aid.

In embodiments of the hearing device, the hearing aid is a behind-the-ear, BTE, hearing aid.

In embodiments of the hearing device, the hearing device is an ear bud.

This and other aspects will be apparent from and elucidated with reference to the embodiments described hereinafter.

BRIEF DESCRIPTION OF THE FIGURES

The embodiments will be described with reference to the accompanying figures. The figures show one way of implementing the various features, and are not to be construed as being limiting to other possible embodiments falling within the scope of the claims.

DETAILED DESCRIPTION

Figure 1:
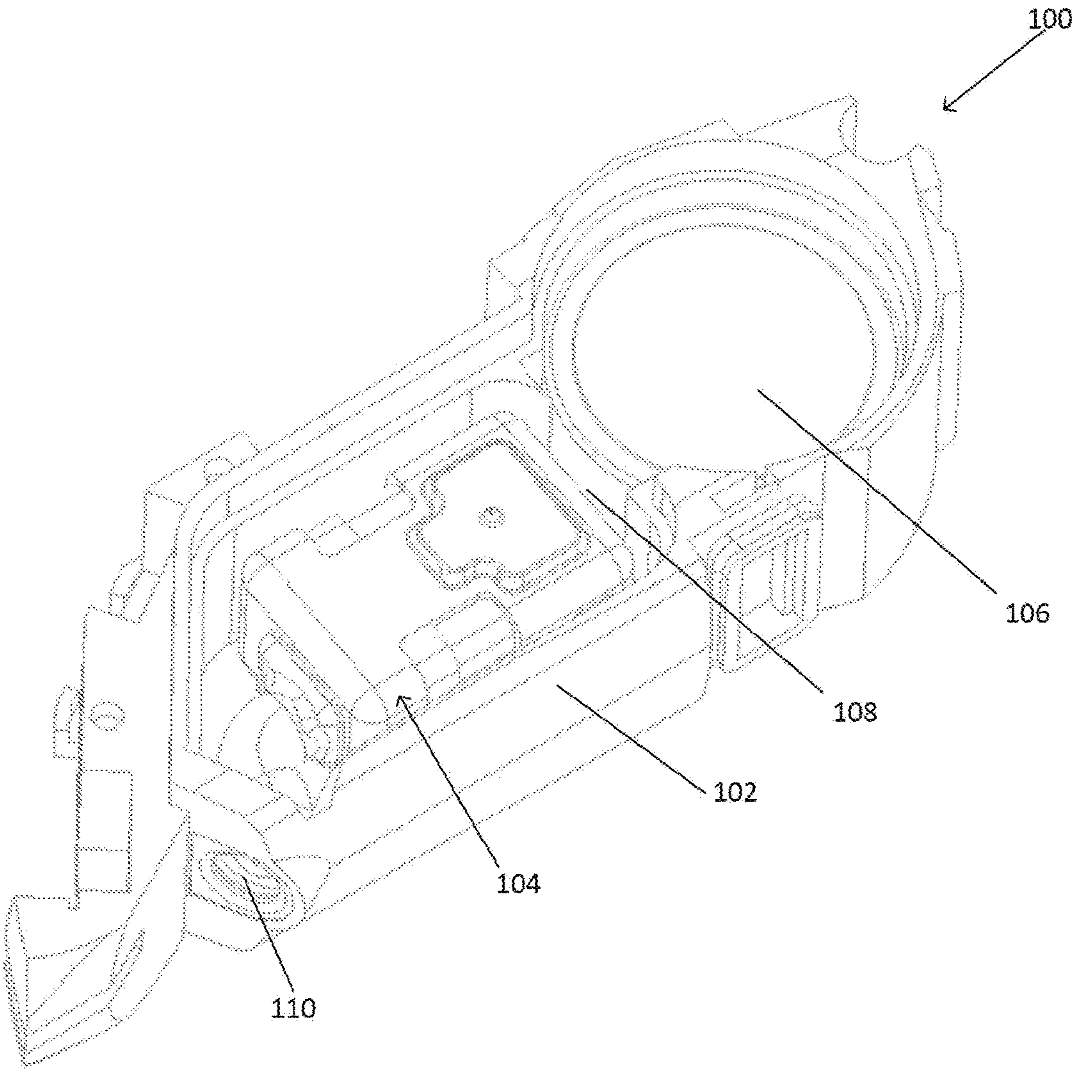
FIG. 1 is an embodiment of a hearing device.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1 illustrates a partly assembled hearing device 100 according to an embodiment. The hearing device 100 is here illustrated as a behind-the-ear (BTE) hearing aid. The hearing device 100 comprises an outer shell (not shown) that defines an outer compartment. The outer shell is mounted onto and supported internally by a housing frame 102. Thus, in this case, the housing frame 102 defines an inner limit of the outer compartment. A sealed inner compartment 108 is arranged within the outer compartment and is configured to hold a receiver 104 and a rechargeable battery 106. The receiver 104 comprises a speaker, which in this embodiment is in communication with a wearer via a sound port 110 and a sound tube connected thereto (not shown). Sealing the inner compartment 108 solves both protecting the rechargeable battery 106 from the surroundings and protecting the receiver 104, in a space efficient way. Thus, the hearing device 100 may be reduced in size while maintaining a desired level of protection of both the battery 106 and receiver 104. For instance, it is seen from the figure that no wall is needed between the rechargeable battery 106 and receiver 104, which directly enables a space saving. Not shown in the figure is the sealing lid for sealing the inner compartment 108 and an optional printed circuit board assembly (PCBA) arranged in the outer compartment, outside the sealed inner compartment. Other components of the hearing device 100 may then also be arranged outside the sealed inner compartment, such as one of more of a microphone, a push button, a volume control, a magnetic induction (MI) coil, and a wireless antenna.

Figure 2:
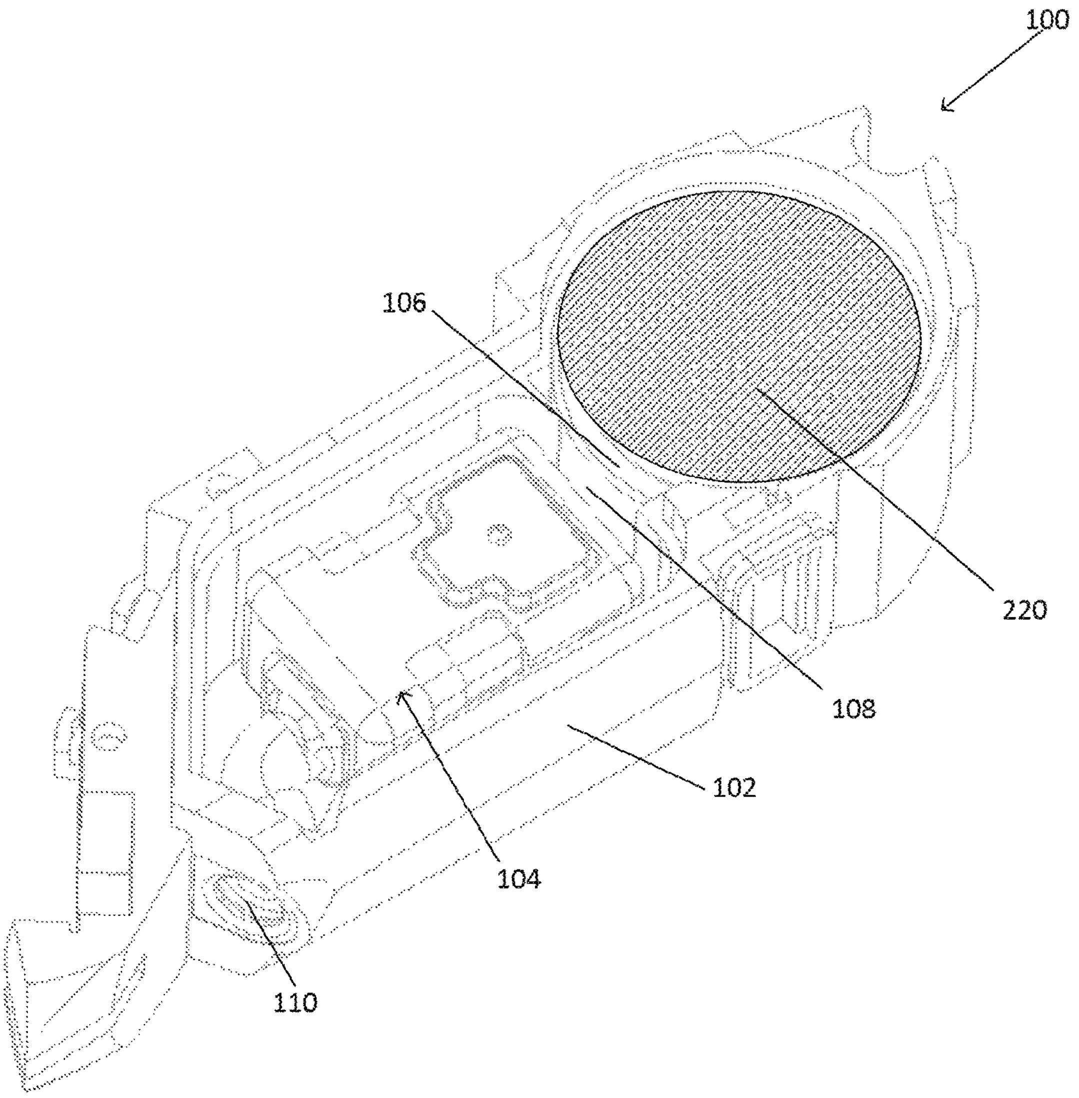
FIG. 2 is another embodiment of the hearing device.

FIG. 2 shows another embodiment of the hearing device 100. This embodiment relates to the embodiment of FIG. 1, where like reference numerals refer to like parts, and only the differences will be described here. In this embodiment, a power management circuit 220 is arranged on top of the rechargeable battery 106, i.e. within the sealed inner compartment 108. The power management circuit 220 may be arranged in a metal housing for noise protection. An advantage of this embodiment is that the power management circuit 220 is then also environmentally protected inside the sealed inner compartment 108. The power management circuit 220 arranged in the sealed inner compartment may optionally comprise a MI coil. In other embodiments, the MI coil may be arranged in the outer compartment.

Figure 3A:
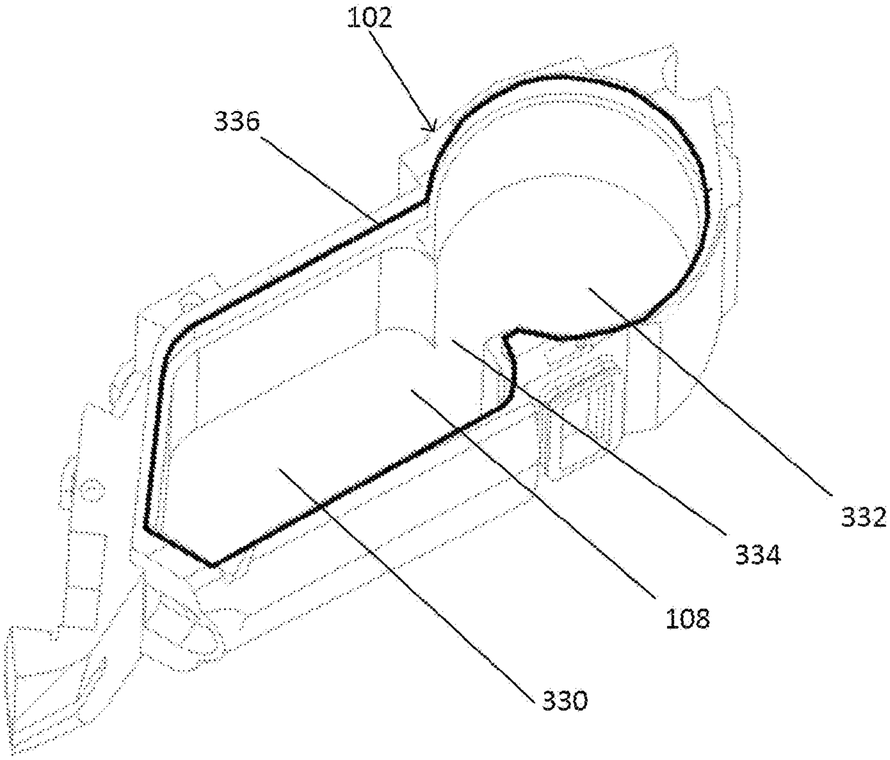
FIGS. 3*a*, 3*b*, and 3*c* illustrate details of embodiments.
Figure 3B:
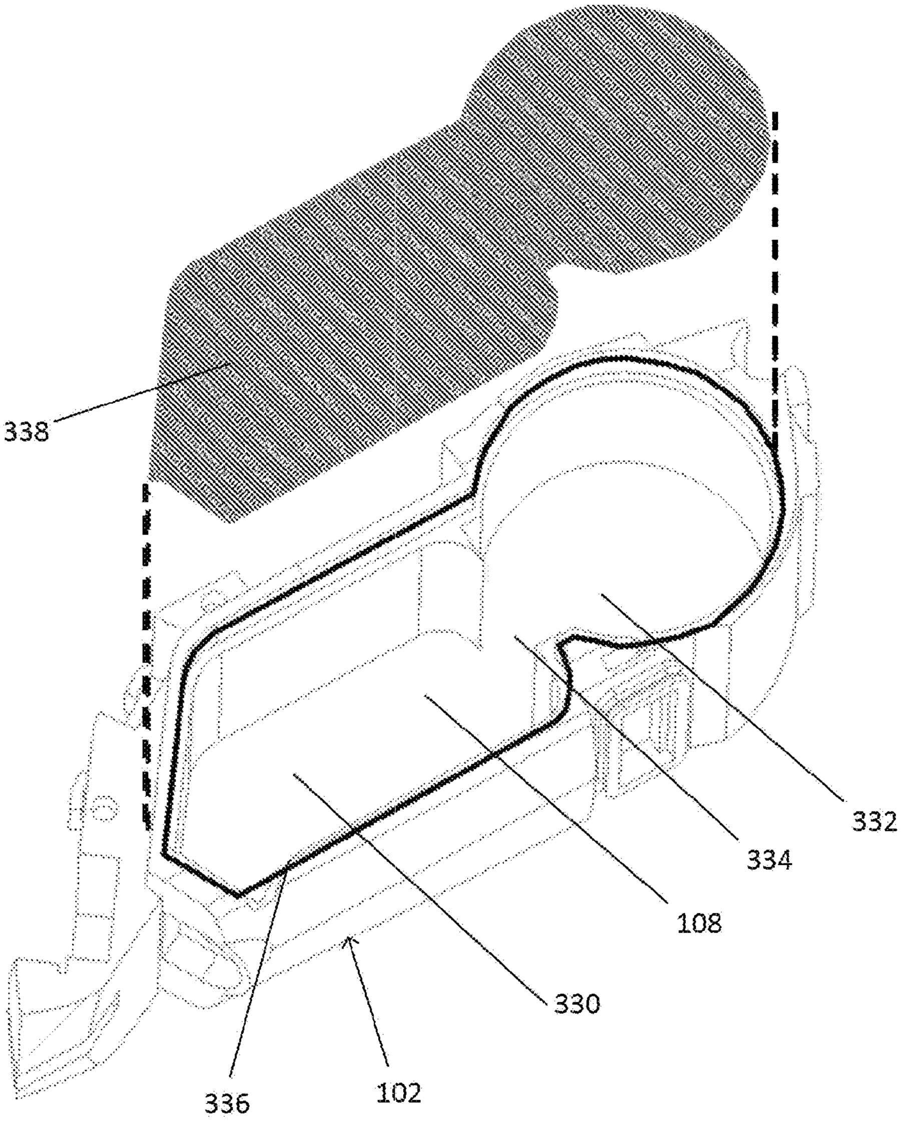
Figure 3C:
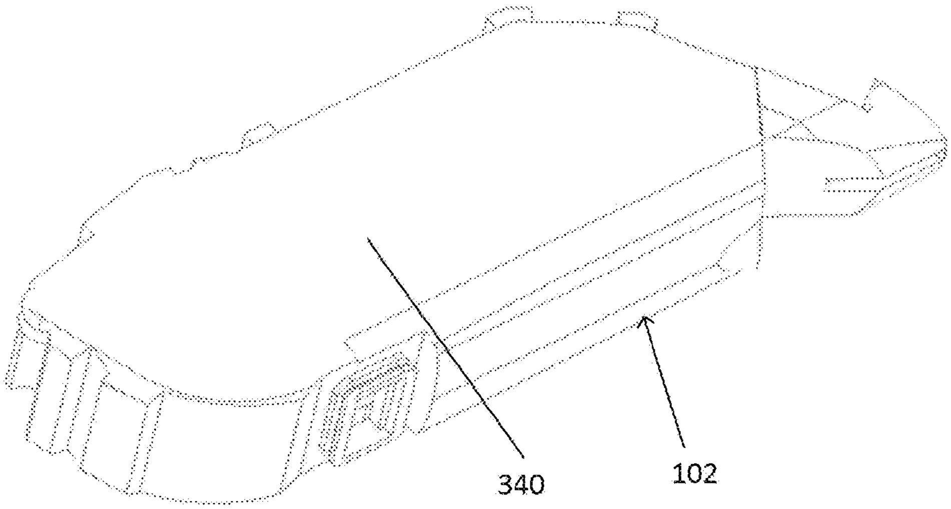

FIG. 3*a* shows details of the housing frame 102 according to embodiments. These embodiments relate to the embodiments of FIGS. 1 and 2, where like reference numerals refer to like parts. The housing frame 102 shown is similar to the housing frames 102 of FIGS. 1 and 2, but shown without the receiver 104 and rechargeable battery 106 mounted. The inner compartment is seen in this embodiment to comprise a receiver section 330 suitable for housing the receiver 104, and a battery section 332 suitable for housing the rechargeable battery 106. The receiver section 330 and the battery section 332 are seen to be connected via a narrowing 334. Thus, the two sections 330, 332 are open towards each other and not separated by wall. This is advantageous for reducing the dimensions of the assembled hearing device 100. Naturally, a separating wall may optionally be introduced in some embodiments. To enable sealing the inner compartment 108, a top opening 336 of the housing frame 102 may be shaped with an architecture such as an edge for placement, fixation, and sealing of a lid. For instance, a recessed edge part may be arranged along the top opening 336 of the housing frame 102. In FIG. 3*b*, a lid 338 is shown to match up with the top opening 336 of the housing frame 102. Mounting the lid 338 on the housing frame 102 may for instance be achieved by use of an adhesive to fixate the lid 338 and seal the inner compartment 108. Alternatively, the lid 338 may be mounted with ultrasonic welding, ultra-violet (UV) cured glue, a press fitting, or the like. The lid 338 may for instance be made from a metal, a polymer, or a composite material. FIG. 3*c* shows a bottom side 340 of the housing frame 102. In some embodiments, the housing frame 102 and the bottom side 340 are integrally formed, for instance by casting or molding.

Figure 4:
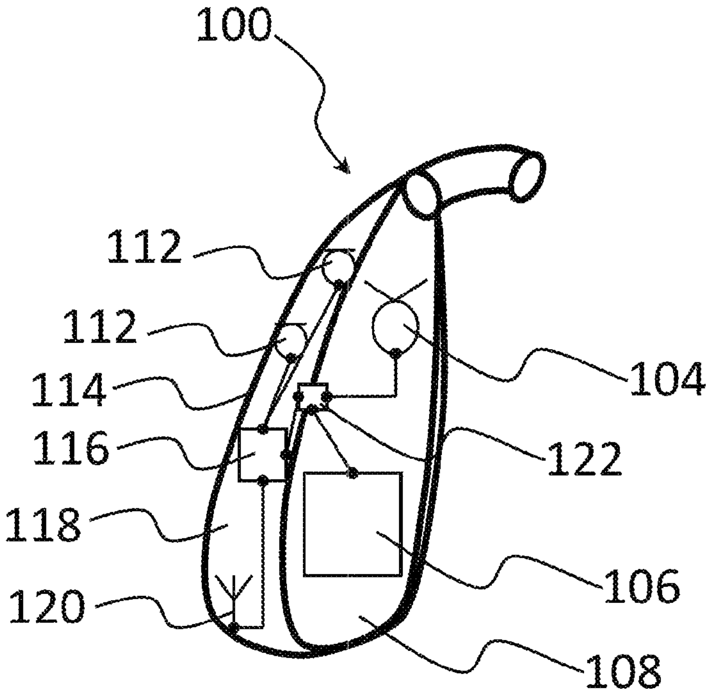
FIG. 4 shows a schematic illustration of a hearing aid according to some embodiments.

FIG. 4 shows a schematic illustration of a hearing device 100 according to some embodiments. The shown hearing device 100 is a behind the ear hearing aid configured for placement behind a user's ear. The hearing device 100 comprises an outer shell 114, which defines an outer compartment 118. A sealed inner compartment 108 is arranged in the outer compartment 118.

The hearing device 100 comprises multiple microphones 112 arranged in the outer compartment 118 outside the inner compartment 108. The microphones 112 are configured for capturing sound and providing an electric input signal representing the captured sound. The hearing device 100 comprises a signal processor 116 arranged in the outer compartment 118 outside the inner compartment 108. The signal processor 116 is coupled to the microphones 112 and configured for processing the electric input signal to provide an electric output signal based on the electric input signal.

The hearing device 100 comprises an antenna 120, preferably an MI coil, configured for wireless communication, i.e. transmission and/or reception of wireless signals, with another hearing device and/or an external device, such as a smart phone or external microphone. The antenna 120 is coupled to a wireless communication device, such as a radio. In the shown embodiments the wireless communication device is incorporated in the signal processor 116 but it may also be provided by a separate unit, such as a radio chip. The signal processor 116 may also process signals received by the antenna 120 so that the electric output signal may be based on both the electric input signal and received wireless signals.

The hearing device 100 comprises a rechargeable battery 106 arranged in the inner compartment 108. The hearing device 100 further comprises a receiver 104 arranged in the inner compartment 108. The receiver 104 is coupled to the signal processor 116 and is configured for generating an acoustic signal based on the electric output signal. The sealed inner compartment 108 is provided with an electrical interface 122, which allows for coupling between electric components arranged inside the inner compartment 108, such as the rechargeable battery 106 and the receiver 104, and electric components arranged outside the inner compartment 108, such as the microphones 112, the signal processor 116, and the antenna 120, while maintaining the seal of the inner compartment 108.

Some or all of the electric components arranged outside the inner compartment 108, such as the microphones 112, the signal processor 116, and the antenna 120, may be provided on and/or in a printed circuit board assembly (PCBA) arranged outside the inner compartment 108.

In the context of the claims, the terms "comprising" or "comprises" do not exclude other possible elements or steps. Also, the mentioning of references such as "a" or "an" etc. should not be construed as excluding a plurality. Furthermore, individual features mentioned in different claims, may possibly be advantageously combined, and the mentioning of these features in different claims does not exclude that a combination of features is not possible and advantageous.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications, and equivalents.

The invention claimed is:

1. A hearing device comprising:
- an outer shell, the outer shell defining an outer compartment;
- a receiver;
- a rechargeable battery; and
- a sealed inner compartment in the outer compartment, wherein the receiver and the rechargeable battery are both arranged in the sealed inner compartment.

2. The hearing device according to claim 1, wherein the receiver and rechargeable battery combined take up at least 40% of a volume of the sealed inner compartment.

3. The hearing device according to claim 1, wherein the receiver and rechargeable battery combined take up at least 50% of a volume of the sealed inner compartment.

4. The hearing device according to claim 1, further comprising a power management circuit in the sealed inner compartment.

5. The hearing device according to claim 1, further comprising a frame inside the outer shell, wherein the sealed inner compartment is surrounded by the frame.

6. The hearing device according to claim 1, further comprising a magnetic induction (MI) coil, wherein the MI coil is in the outer compartment, outside the sealed inner compartment.

7. The hearing device according to claim 1, further comprising a magnetic induction (MI) coil, wherein the MI coil is in the sealed inner compartment.

8. The hearing device according to claim 1, further comprising an inductive charging coil, the inductive charging coil located inside the sealed inner compartment.

9. The hearing device according to claim 1, further comprising a printed circuit board assembly (PCBA), the printed circuit board assembly located in the outer compartment, outside the sealed inner compartment.

10. The hearing device according to claim 1, further comprising one or more openings for accommodating electrical connections extending between the sealed inner compartment and the outer compartment, outside the sealed inner compartment.

11. The hearing device according to claim 10, further comprising one or more sealings in the one or more openings.

12. The hearing device according to claim 11, wherein the one or more sealings are configured to seal against sound and/or humidity.

13. The hearing device according to claim 11, wherein the one or more sealings are separate from the sealed inner compartment.

14. The hearing device according to claim 11, wherein the one or more sealings are molded with a plastic frame.

15. The hearing device according to claim 1, further comprising a signal processor in the outer compartment outside the sealed inner compartment.

16. The hearing device according to claim 1, wherein the sealed inner compartment comprises a receiver section for accommodating the receiver, and a battery section for accommodating the rechargeable battery, and wherein the receiver section is in fluid communication with the battery section.

17. The hearing device according to claim 1, wherein the sealed inner compartment comprises a continuous wall extending around a perimeter of the sealed inner compartment.

18. The hearing device according to claim 5, wherein the sealed inner compartment surrounded by the frame is a structure fixed to the frame.

19. The hearing device according to claim 5, wherein the sealed inner compartment is a space defined by the frame.

20. A hearing device comprising:
- a housing, the housing defining a space;
- a receiver;
- a rechargeable battery; and
- a structure located inside the space defined by the housing, the structure surrounding a sealed inner compartment, wherein the receiver and the rechargeable battery are both arranged in the sealed inner compartment surrounded by the structure, and wherein the structure occupies only a part, not an entirety, of the space defined by the housing.

21. The hearing device according to claim 20, wherein the structure comprises a frame.

22. The hearing device according to claim 20, wherein the receiver and rechargeable battery combined take up at least 40% of a volume of the sealed inner compartment.

23. The hearing device according to claim 20, wherein the receiver and rechargeable battery combined take up at least 50% of a volume of the sealed inner compartment.

24. The hearing device according to claim 20, further comprising a power management circuit in the sealed inner compartment.

25. The hearing device according to claim 20, further comprising a magnetic induction (MI) coil, wherein the MI coil is in the space defined by the housing, outside the sealed inner compartment.

26. The hearing device according to claim 20, further comprising a magnetic induction (MI) coil, wherein the MI coil is in the sealed inner compartment.

27. The hearing device according to claim 20, further comprising an inductive charging coil, the inductive charging coil located inside the sealed inner compartment.

28. The hearing device according to claim 20, further comprising a printed circuit board assembly (PCBA), the printed circuit board assembly located in the space defined by the housing, outside the sealed inner compartment.

29. The hearing device according to claim 20, further comprising a signal processor in the space defined by the housing, and outside the sealed inner compartment.

30. The hearing device according to claim 20, wherein the sealed inner compartment comprises a continuous wall extending around a perimeter of the sealed inner compartment.

* * * * *